Dec. 31, 1940. M. R. REINHOLD 2,226,832
HAM FORM
Filed May 31, 1939 2 Sheets-Sheet 1

INVENTOR
Max R. Reinhold
BY
Morsell, Lieber & Morsell
ATTORNEYS.

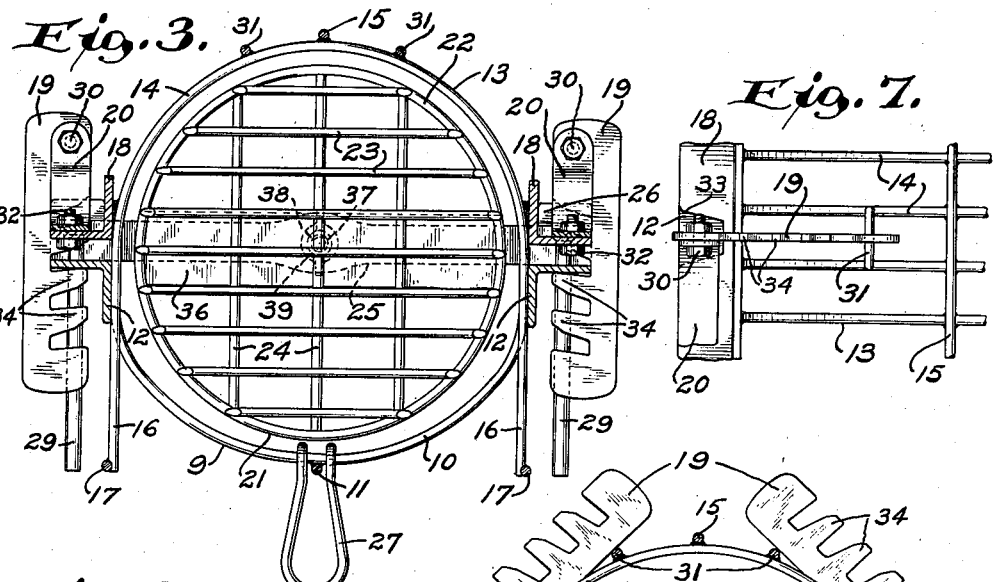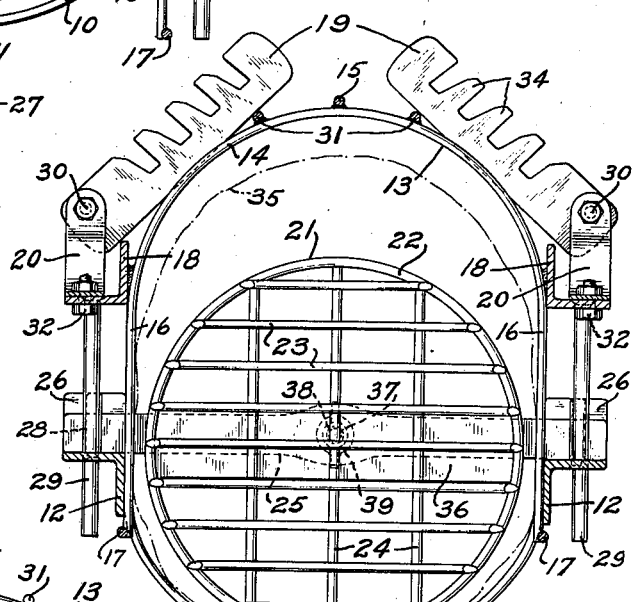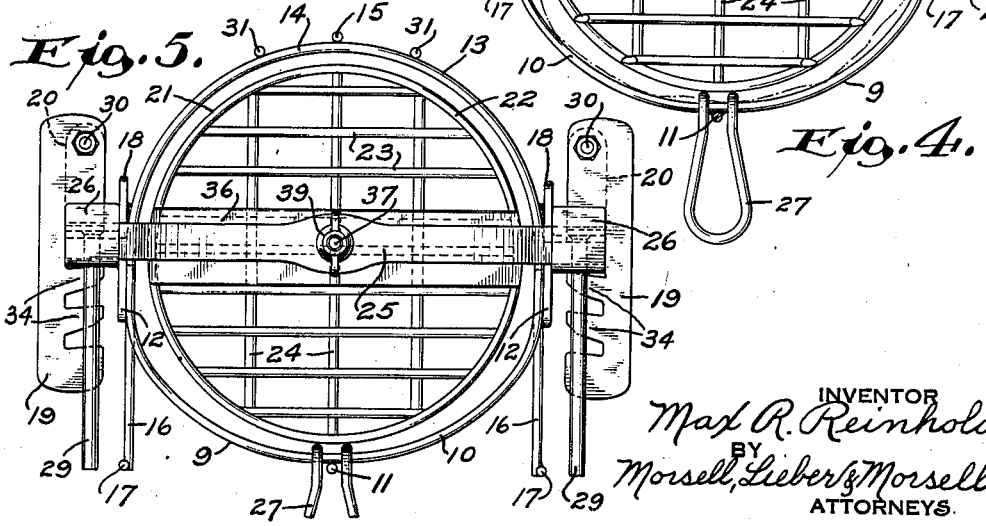

Patented Dec. 31, 1940

2,226,832

UNITED STATES PATENT OFFICE 2,226,832

HAM FORM

Max R. Reinhold, Milwaukee, Wis.; Madeline Marlier, executrix of said Max R. Reinhold, deceased Application May 31, 1939, Serial No. 276,573

4 Claims. (Cl. 53—22)

The present invention relates in general to improvements in the art of treating foods in order to render them more palatable, and relates more specifically to improvements in the construction and operation of forms or cages for confining comestibles such as meat during smoking and boiling thereof.

Generally defined, an object of my present invention is to provide an improved form for confining commodities such as hams during treatment thereof preparatory to marketing.

Many different types of so-called cages or forms have heretofore been suggested and utilized with more or less success, for the purpose of confining meats such as sausage and ham while being smoked, boiled and otherwise treated.

When effecting such treatment, the individual hams are usually deboned and confined within cloth bags or casings, after which they are clamped in individual wire cages in an effort to cause them to assume definite shape and to be compactly compressed when finally treated. At various stages of the treatment, the mass of meat tends to expand and to contract, and this variation in size must be automatically compensated for in order to constantly retain the mass in uniformly compressed condition and of definite shape capable of being cut with minimum waste in slicing machines. It has been found that waste may be best materially reduced if the finally treated hams are of approximately cylindrical shape with squared ends, and if the product is so shaped and uniformly compressed, attractive slicing is made readily possible. The prior ham forms of this type, besides being extremely complicated and difficult to load and manipulate, were not adapted to compensate for expansion and contraction and moreover did not produce finally treated hams of regular form wherein cutting waste could be minimized.

It is therefore a more specific object of the present invention to provide an improved ham form or cage, wherein the hams are free to expand or contract during treatment thereof, and which produces finally treated hams of most desirable shape adapted to minimize waste during subsequent slicing thereof.

Another specific object of my present invention is to provide a simple, compact and durable form for confining hams or the like, which may be readily manipulated, and wherein uniform treatment of all portions of the mass of meat is assured.

A further specific object of this invention is to provide a ham confining cage which may be quickly and conveniently adjusted for proper coaction with hams of different diameters and lengths, and wherein changes in size during treatment are automatically compensated for.

Still another specific object of the present invention is to provide a sanitary metal ham form which may be readily recoated as by galvanizing, in order to prevent rusting or corrosion and to maintain the same in sanitary condition.

An additional specific object of my invention is to provide an improved wire cage assemblage for loaf-like commodities, which may be manufactured and sold at moderate cost and which is also most effective in use.

These and other objects and advantages of the present invention will be apparent from the following detailed description.

A clear conception of the various features constituting my present improvement, and of the mode of constructing and of utilizing ham forms built in accordance with the invention, may be had by referring to the drawing accompanying and forming a part of this specification wherein like reference characters designate the same or similar parts in the various views.

Fig. 3 is a transverse vertical section through the assemblage of Fig. 1, taken along the line 3—3;

Fig. 4 is a transverse vertical section through the assemblage as shown in Fig. 2, the section being taken along the line 4—4;

Fig. 5 is an end view of the form with the parts in clamping position as in Figs. 1 and 3;

Fig. 6 is an enlarged central vertical section through a fragment of one end of the assemblage, showing the details of construction of the end retainer adjusting mechanism;

Fig. 7 is an enlarged top view of a fragment of one side of the form assemblage, showing one of the clamping hooks.

Figure 1:
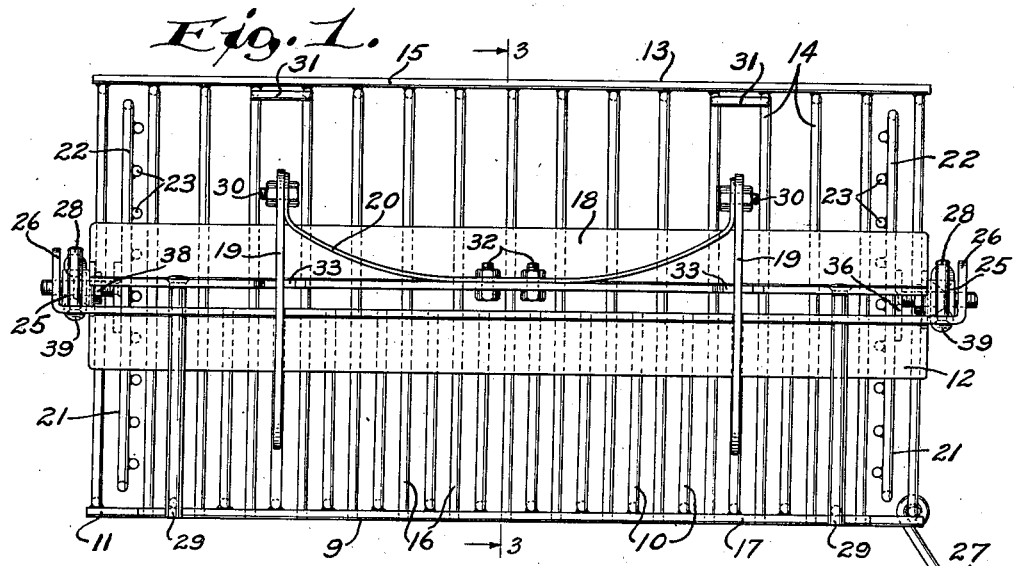
Fig. 1 is a side elevation of one of my improved forms with the end retainers in place and with the longitudinal top and bottom sections in clamping position.
Figure 2:
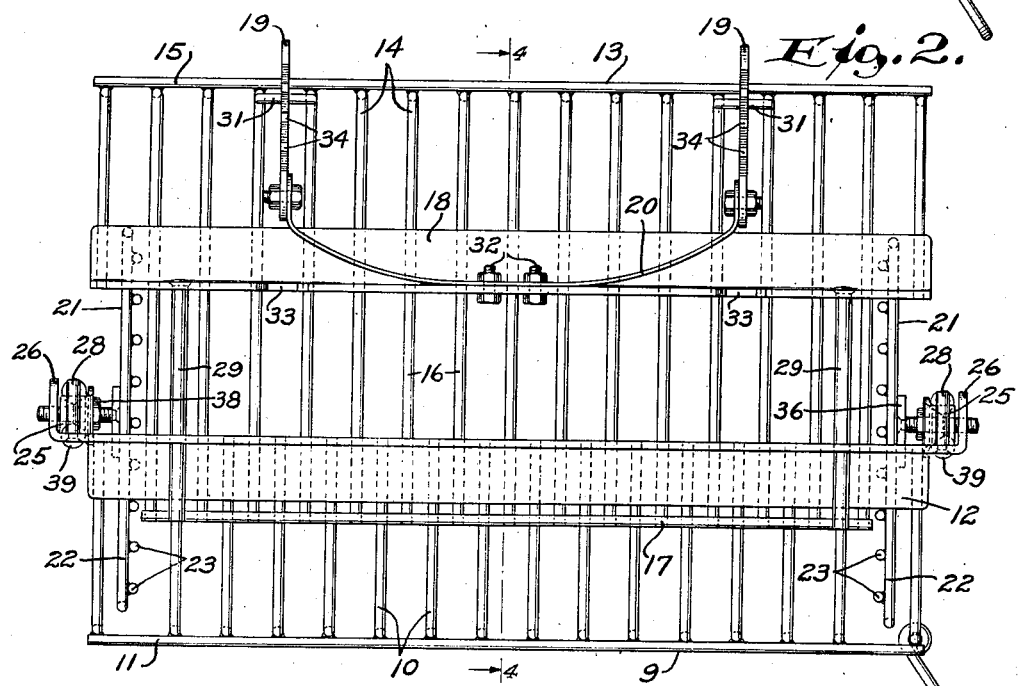
Fig. 2 is a side elevation of the assemblage shown in Fig. 1, but with the top and bottom sections spread apart.

While I have shown and described my invention as being particularly applicable for the treatment of meat such as ham, it is not the intention to unnecessarily restrict the scope of utility of the improvement.

Referring to the drawing, the improved ham form specifically illustrated comprises in general a base or lower section 9 formed of a series of approximately semi-circular parallel wires 10 interconnected midway between their ends by a retaining wire 11 and having their opposite extreme ends rigidly attached to lower elongated side members or angle bars 12; a top or upper section 13 formed of a series of U-shaped parallel wires 14 interconnected between their ends by an upper central retaining wire 15 and having their opposite end portions 16 formed straight and rigidly attached to elongated end rods or wires 17; opposite side clamping assemblages including upper elongated side members or angle bars 18 rigidly attached to the upper section wires 14 above the straight end portions 16, and spaced clamping hooks 19 swingably associated with the extreme ends of supporting leaf springs 20 the medial portions of which are secured to the bars 18; and a pair of end plates or retainers 21 each consisting of a circular wire 22 and intersecting horizontal and vertical wires 23, 24 respectively, and a leaf spring 25 adjustably secured centrally to each retainer plate and having deflectable end portions detachably cooperable with the upturned ends 26 of the bars 12 to maintain the retainers 21 in assembled position.

The wire used in the formation of the lower and upper cage sections 9, 13 and end retainers 21, is preferably of sufficient rigidity to resist distortion of the form during normal use and handling, and the entire assemblage excepting the leaf springs 20, 25 is preferably coated with a sanitary coating such as galvanizing. The lower elongated semi-cylindrical section 9 may be provided with a handling and suspending sling 27 secured to one of the end wires 10 thereof, and the outwardly extending flanges of the angle bars 12 forming part of the lower section 9 have the end flanges 26 formed integral therewith and are provided with upright pins 28 spaced inwardly from these flanges 26 and cooperating therewith to provide relatively deep retaining recesses for the ends of the springs 25. The outwardly projecting flanges of the bars 12 are also provided with spaced holes through which parallel guide rods 29 secured to the upper bars 18 are slidable, and the lower wires 17 which are secured to the straight wire portions 17 are adapted to engage the lowermost edges of the bars 12 in order to prevent complete separation of the cage sections 9, 13.

The upper elongated section 13 has its U-shaped wires 14 disposed between the wires 10 of the lower section 9, and the straight portions 16 of the wires 14 coact with the inner faces of the angle bars 12 and thus cooperate with the guide rods 29 to insure parallel movement of the section 13 relative to the section 9. The hooks 19 which are carried by the upper section 13, are swingably but detachably secured to the ends of the leaf springs 20, by means of pivot bolts 30, and are adapted to rest against stop rods 31 secured to the adjacent wires 14 when not in use, as shown in Fig. 4. The medial portions of the side leaf springs 20 are rigidly but detachably secured to the upper angle bars 18 by means of other bolts 32, and the outwardly extending flanges of the upper angle bars 18 are provided with V-shaped notches 33 as shown in Fig. 7, which permit the hooks to be swung into clamping position without obstruction. Each of the hooks 20 has a series of clamping projections or tines 34 which are adapted to engage the outwardly projecting flange of the adjacent lower angle bar 12 and to be held in clamping cooperation therewith by the corresponding spring 20.

The two end plates or retainers 21 are of like construction and are therefore interchangeable; and the springs 25 which coact with the bar flanges 26 and with the pins 28, are adjustably associated with the end retainer plates as clearly illustrated in Fig. 6 so as to permit these plates to cooperate with the ends of hams 35 of different lengths. Each retainer has a transverse central bar 36 rigidly attached to the wires 24 thereof, and a threaded stud 37 is firmly attached to the center of each bar 36 and projects outwardly therefrom. The leaf springs 25 have threaded bushings 38 rigidly attached thereto, and these bushings 38 coact with the corresponding studs 37 so that by revolving the springs 25 about their carrying studs 37, the springs may be positioned at different distances from their retainers 21. Thumb nuts 39 coacting with the studs 37 may then be utilized to lock the springs 25 in adjusted position, and it is to be noted that the springs 25 may be readily removed from the retainers 31 when it is desired to clean or re-galvanize the latter.

In preparing meats such as ham for treatment in the improved form, the bones are first removed and the meat is inserted within a fabric or other receptacle and is enclosed within this receptacle. This leaves the contents in rather spongy and compressible condition, and the enclosure is approximately the shape which is to be assumed by the final ham 35.

Figure 8:
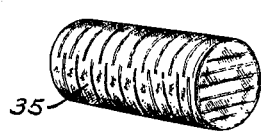
Fig. 8 is a small perspective view of one of the finally treated hams.

In utilizing the improved apparatus for the treatment of these hams 35, the lower and upper cage sections 9, 13 should first be spread as illustrated in Fig. 4, with the hooks 19 resting against the stop bars 31, whereupon either one of the end retainers 21 may be removed to make one end of the cage open for insertion of the ham 35. The ham may then be inserted as indicated in dot-and-dash lines in Fig. 4, whereupon the removed retainer 21 should be inserted, and in applying the retainers 21, they should be so adjusted relative to their pressure springs 25, that they approximately engage the opposite ends of the newly inserted ham 35. Pressure may then be applied to the upper cage section 13 to force this section against the ham 35 and to compress the latter and cause its ends to engage the entire inner sides of the two end retainers 21. In other words, the ham 35 should be compressed into substantially cylindrical form as shown in Fig. 8, so that all portions thereof are snugly engaged by the adjacent portions of the cage assemblage. The hooks 19 may then be applied to the lower bars 12 so as to retain the confined ham resiliently clamped within the cage, whereupon the clamping pressure may be released and the assemblage is ready for handling and treatment of the confined ham.

The sling 27 may then be utilized to hang the ham and its confining cage within a smoking chamber, and when the ham has been sufficiently smoked, it may be inserted in a boiling vat for final treatment. During the boiling operation the ham 35 will tend to shrink and thus destroy the clamping action. However, as the ham 35 shrinks within the cage, the compressed leaf springs 20, 25 automatically act to force the cage sections 9, 13 and the retainers 21 into intimate contact with the receding ham, so that the clamping effect is maintained throughout the treating operation and until the finally treated ham is ultimately removed from its confinement. Such removal of the ham may obviously be effected by releasing the hooks 19 and one of the end retainers 21.

It has been found through actual commercial use of the improved ham form, that substantially cylindrical hams 35 such as shown in Fig. 8, may be readily produced. These hams with their squared ends may subsequently be cut in a slicing machine with minimum waste, and it has also been found that the resilient restraining force exerted by the springs 20, 25, produces more uniform consistency throughout the entire body of the ham 35. These springs 20, 25, function to automatically compensate for both expansion and contraction, and also tend to subject the entire ham to uniform pressure throughout the treating operation.

From the foregoing detailed description it will be apparent that my present invention provides an improved cage or form for most effectively treating meats and similar loaf-like objects, and for insuring most desirable final shaping of the treated objects. The objects being treated are obviously subjected to uniform clamping pressure throughout their entire areas, and are constantly subjected to resilient clamping pressure due to action of the springs 20, 25. The assemblage may be conveniently manipulated for insertion and removal of the hams 25, and in case recoating of the cage becomes desirable, the springs 20, 25 may be quickly removed. The adjustment afforded by the end retainers 21 is also important because it permits most effective treatment of hams of varying lengths and diameter, and the entire cage is sufficiently open so as to permit most effective smoking and boiling without having local untreated areas. The improved cage is relatively light but durable, and may be manufactured and sold at moderate cost. The assemblage is furthermore safely manipulable and can be readily maintained in sanitary condition at all times.

It should be understood that it is not desired to limit this invention to the exact details of construction or to the precise mode of use, herein shown and described, for various modifications within the scope of the claims may occur to persons skilled in the art.

I claim:

1. A meat form comprising a pair of relatively movable concave sections formed for coaction with the periphery of an approximately cylindrical object, clamping means adjustably cooperable with one of said sections and being resiliently connected to the other, relatively flat end retainers resiliently suspended near the opposite ends of said sections and being cooperable with the ends of an object confined between said sections, and adjustable means for positively varying the distance between said retainers.

2. A meat form comprising, a pair of relatively laterally slidable concave cage sections formed for coaction with the periphery of an approximately cylindrical object, clamping hooks adjustably cooperable with one of said sections and being resiliently connected to the other, relatively flat end retainers resiliently suspended from the opposite ends of one of said sections and being cooperable with the ends of an object confined between said sections, and jack screws for positively varying the distance between said retainers.

3. A meat form comprising, a pair of relatively laterally slidable semi-cylindrical cage sections formed for coaction with the periphery of an approximately cylindrical object, leaf springs suspended from the opposite sides of one of said sections and resiliently supporting clamping hooks which are adjustably cooperable with the other section, relatively flat end retainers resiliently suspended by leaf springs from the opposite ends of one of said sections and being resiliently cooperable with the ends of an object confined between said sections, and a jack screw for positively moving each of said retainers along the axis of said sections.

4. A meat form comprising, a pair of relatively laterally slidable cage sections formed for coaction with the periphery of an approximately cylindrical object, a leaf spring suspended from each of the opposite sides of one of said sections and carrying clamping hooks which are cooperable with the other section, relatively flat end retainers resiliently suspended from the opposite ends of one of said sections and being cooperable with the ends of an object confined between said sections, and a jack screw for positively moving each of said retainers toward the other.

MAX R. REINHOLD.